United States Patent [19]

Kuwana

[11] Patent Number: 4,633,576
[45] Date of Patent: Jan. 6, 1987

[54] METHOD OF PRODUCING ARMATURE WINDING AND APPARATUS THEREFOR

[75] Inventor: Tadashi Kuwana, Sukagawa, Japan

[73] Assignee: Yamamoto Electric Industrial Co., Ltd., Fukushima, Japan

[21] Appl. No.: 623,750

[22] Filed: Jun. 22, 1984

[30] Foreign Application Priority Data

Jun. 22, 1983 [JP] Japan .................. 58-112501

[51] Int. Cl.⁴ ............................................. H01R 43/06
[52] U.S. Cl. ............................... 29/597; 29/735; 242/7.03; 242/7.05 B
[58] Field of Search .............. 29/597, 598, 605, 735, 29/732, 733; 242/7.03, 7.05 B, 7.14, 7.17, 7.18

[56] References Cited

U.S. PATENT DOCUMENTS

| | | | |
|---|---|---|---|
| 3,524,250 | 8/1970 | Burr | 29/597 |
| 3,863,336 | 2/1975 | Noto et al. | 29/598 |
| 3,955,273 | 5/1976 | Morinaga et al. | 29/597 |
| 4,052,783 | 10/1977 | Shively | 29/597 |
| 4,291,456 | 9/1981 | Peck, Jr. et al. | 29/597 |
| 4,459,742 | 7/1984 | Banner | 29/735 |

FOREIGN PATENT DOCUMENTS 57-45140 9/1982 Japan .
57-45141 9/1982 Japan .

*Primary Examiner*—Howard N. Goldberg
*Assistant Examiner*—P. W. Echols
*Attorney, Agent, or Firm*—Armstrong, Nikaido, Marmelstein & Kubovcik

[57] ABSTRACT

A method of and an apparatus for producing an armature winding of a flat type motor is disclosed having a motor, a flyer rotated by the motor for feeding a wire for the armature winding out of a nozzle thereof, a bobbin member for winding the wire fed out from the flyer around the outer periphery thereof when the flyer is rotated around it to thereby form a unit coil, first and second moving members for moving the nozzle of the flyer to directions in parallel with and directions perpendicular to a plane formed by the rotation of the nozzle, a turn table capable of mounting a commutator of the center thereof and placing plural unit coils around the commutator, a pushing member for pushing the unit coil wound around the bobbin member to place on the turn table, a guide member for catching a portion of the wire connected between the nozzle and the unit coil placed on the turn table and guiding the catched portion of the wire near corresponding one of hooks of the commutator mounted on the turn table, a revolution number detecting member for detecting the revolution number of the flyer, and a control circuit for controlling the first and second moving members, pushing member and guide member in response to an output of the revolution number detecting member.

5 Claims, 16 Drawing Figures

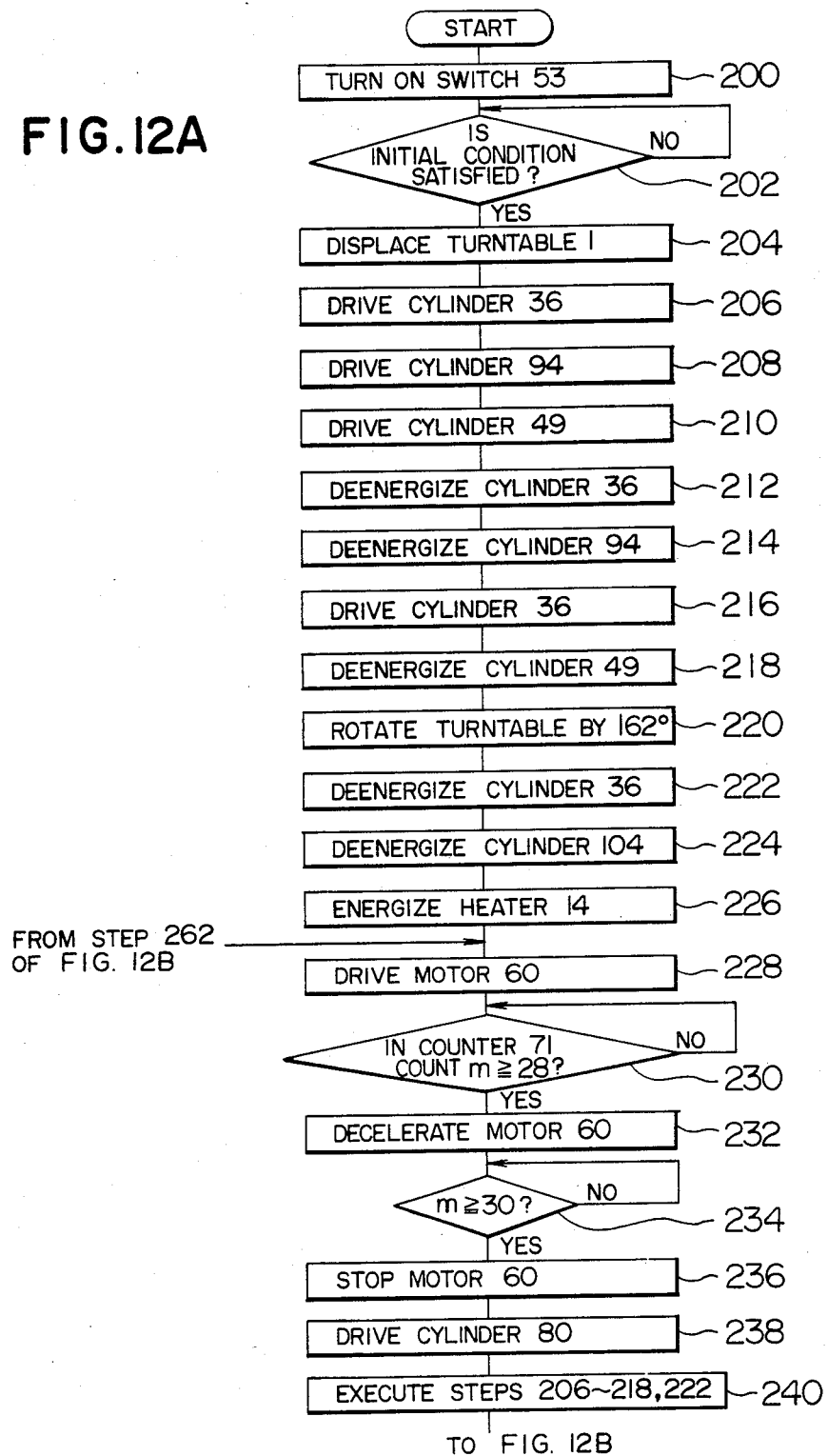

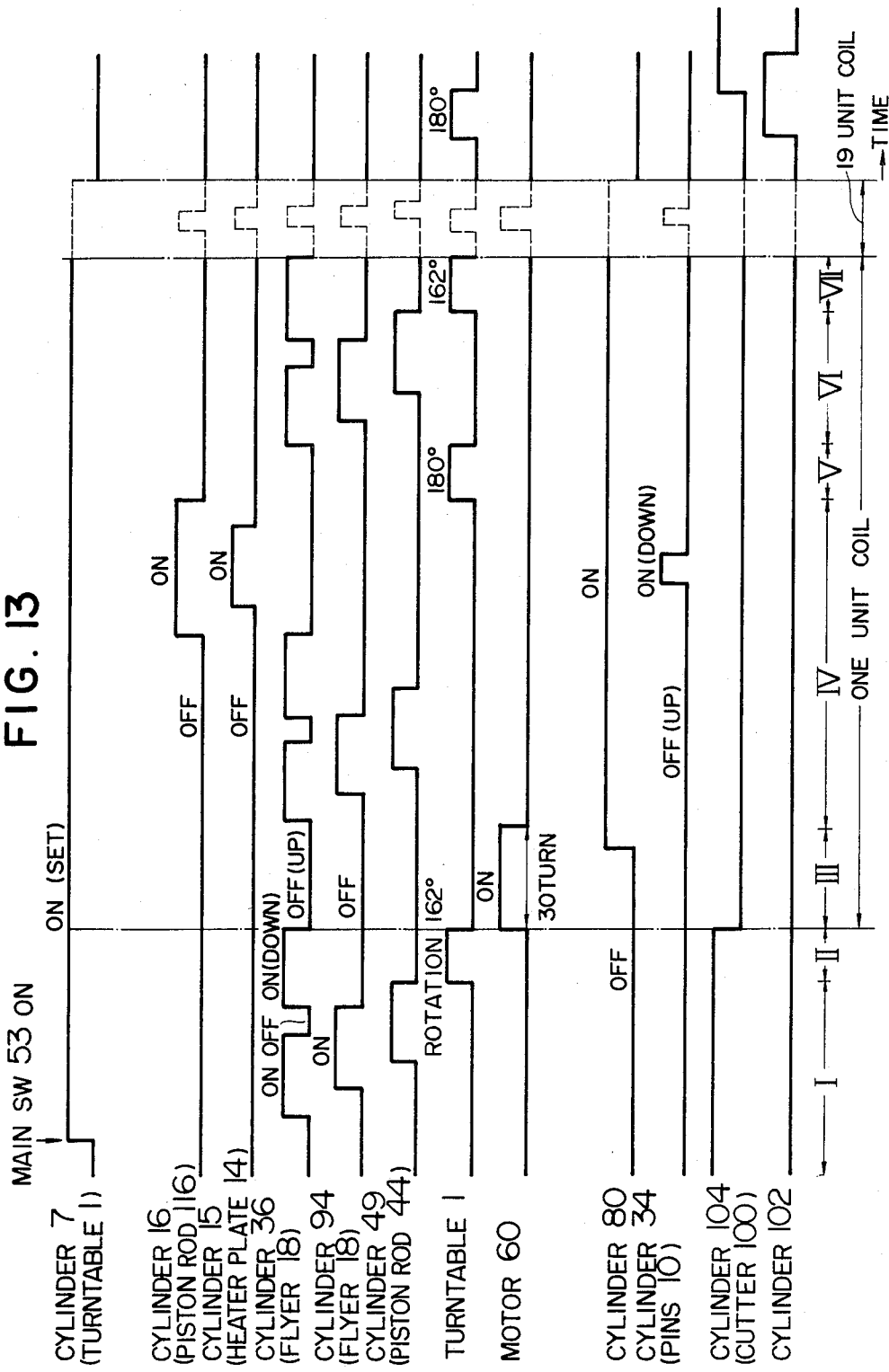

METHOD OF PRODUCING ARMATURE WINDING AND APPARATUS THEREFOR

BACKGROUND OF THE INVENTION

The present invention relates to a method of producing an armature winding for a flat type electric motor and apparatus therefor, in which each unit coil constituting an armature winding of the motor is automatically continuously arranged around a commutator in order to produce the armature winding.

A typical example of a conventional method of producing an armature winding of a flat type motor will be described. First, in a bench winding machine having a flyer and a bobbin, the flyer is rotated around the bobbin a predetermined number of times to form a coil unit. In this manner, a plurality of unit coils are prepared. As a strand for forming such a unit coil, a wire is used on which a thermosetting bonding agent has been applied. Then, the unit coil is heated so that adjacent strand portions are bonded to each other to form a flat rigid unit coil. The thus formed unit coils are radially arranged on a jig plate and around a commutator mounted on the jig plate. Then, the respective lead wires of the unit coils are successively manually connected to hooks of the commutator to thereby complete an armature.

In such a conventional method of producing an armature winding of a flat type motor, a strand is wound around a coil bobbin by a flyer to form a unit coil, the thus formed unit is removed from the coil bobbin, numbers of unit coils formed in the manner as mentioned above are arranged around a commutator, and then lead wires of the unit coils are hooked onto hooks of the commutator. In this conventional method, however, the lead wires of the unit coils get entangled causing difficulty in hooking the lead wires onto the hooks of the commutator. Accordingly, it is very difficult to automatically produce an armature winding for such a flat type motor.

SUMMARY OF THE INVENTION

An object of the present invention is to provide an improved method of producing an armature winding and an improved apparatus therefor, in which unit coils constituting an armature winding are formed and positioned around a commutator to automatically produce the armature winding.

To this end, a method of and an apparatus for producing an armature winding is provided for a flat type motor comprising a motor, a flyer rotated by the motor for feeding a wire for the armature winding out of a nozzle thereof, a bobbin member for winding the wire fed out from the flyer around the outer periphery thereof when the flyer is rotated around it to thereby form a unit coil, first and second moving members for moving the nozzle of the flyer to directions in parallel with and directions perpendicular to a plane formed by the rotation of the nozzle, a turn table capable of having a commutator mounted on the center thereof and placing plural unit coils around the commutator, a pushing member for pushing the unit coil wound around the bobbin member to place on the turn table, a guide member for catching a portion of the wire connected between the nozzle and the unit coil placed on the turn table and guiding the catched portion of the wire near corresponding one of hooks of the commutator mounted on the turn table, a revolution number detector for detecting the number of revolutions of the flyer, and a control circuit for controlling the first and second moving members, pushing member and guide member in response to an output of the revolution number detecting member.

The control circuit drives the motor in order to rotate the flyer for a predetermined number of revolutions around the bobbin member so as to form a unit coil having the predetermined number of turns, to actuate the pushing member so as to place the unit coil on the turn table, and to actuate the first and second moving members and the guide member thereby hooking the wire of the unit coil to the correspoinding hook.

BRIEF DESCRIPTION OF THE DRAWINGS

FIGS. 12A and 12B are flowcharts showing the operation of the apparatus according to the present invention;

FIG. 13 is a time chart showing the operation of the apparatus according to the present invention.

DESCRIPTION OF PREFERRED EMBODIMENTS

Figure 1:
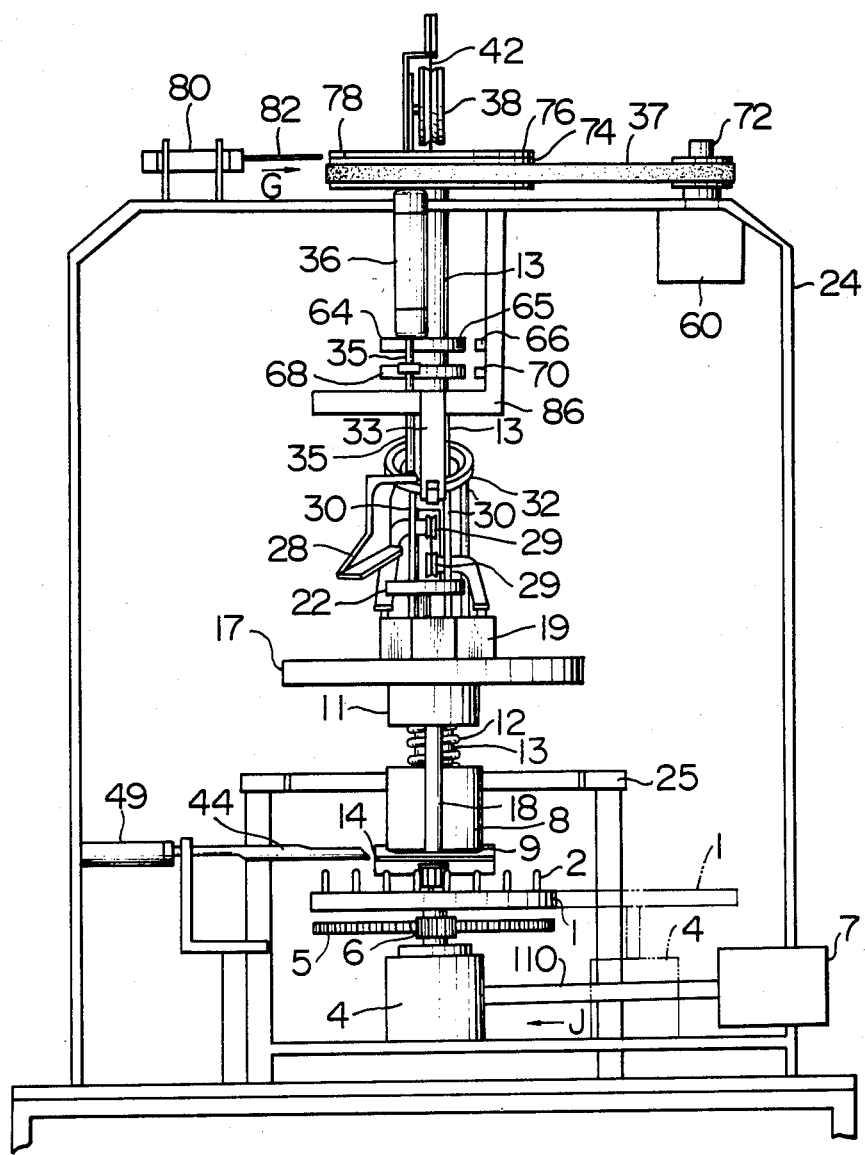
FIG. 1 is a front view of a typical embodiment of the armature winding producing apparatus according to the present invention.
Figure 2:
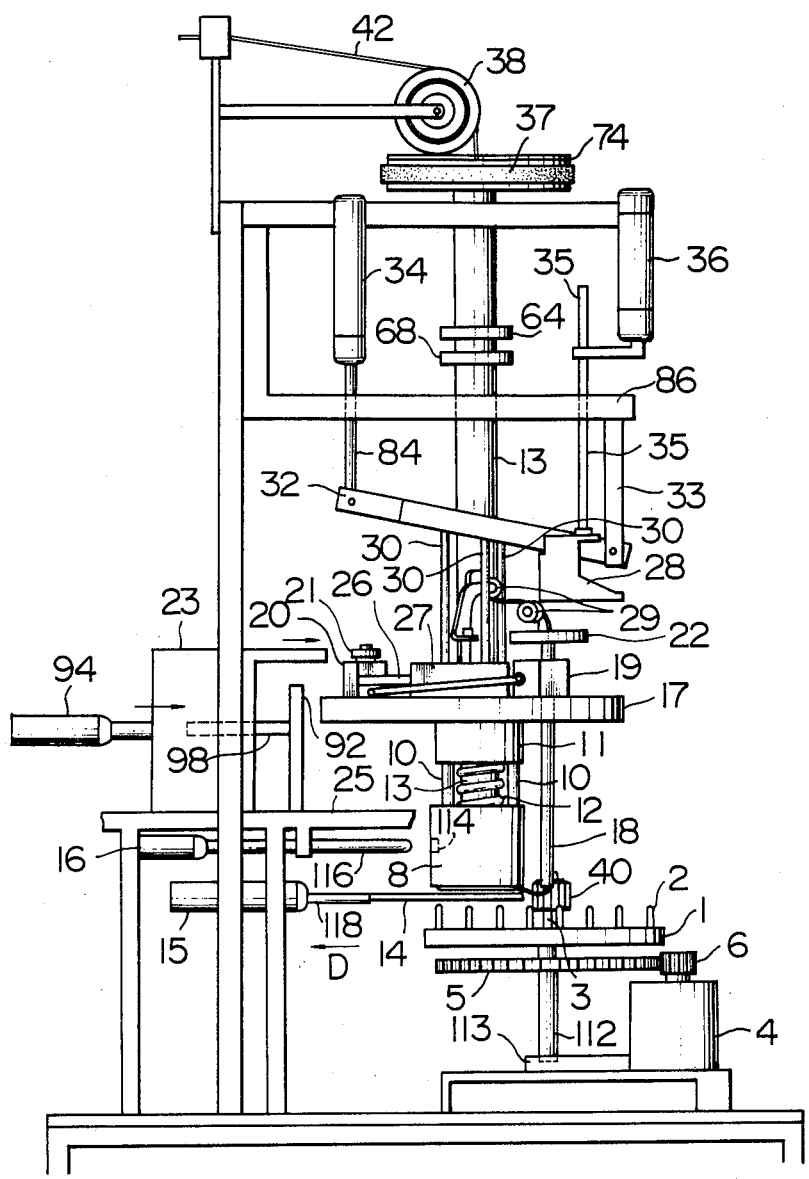
FIG. 2 is a side view of the armature winding producing apparatus of FIG. 1.
Figure 3:
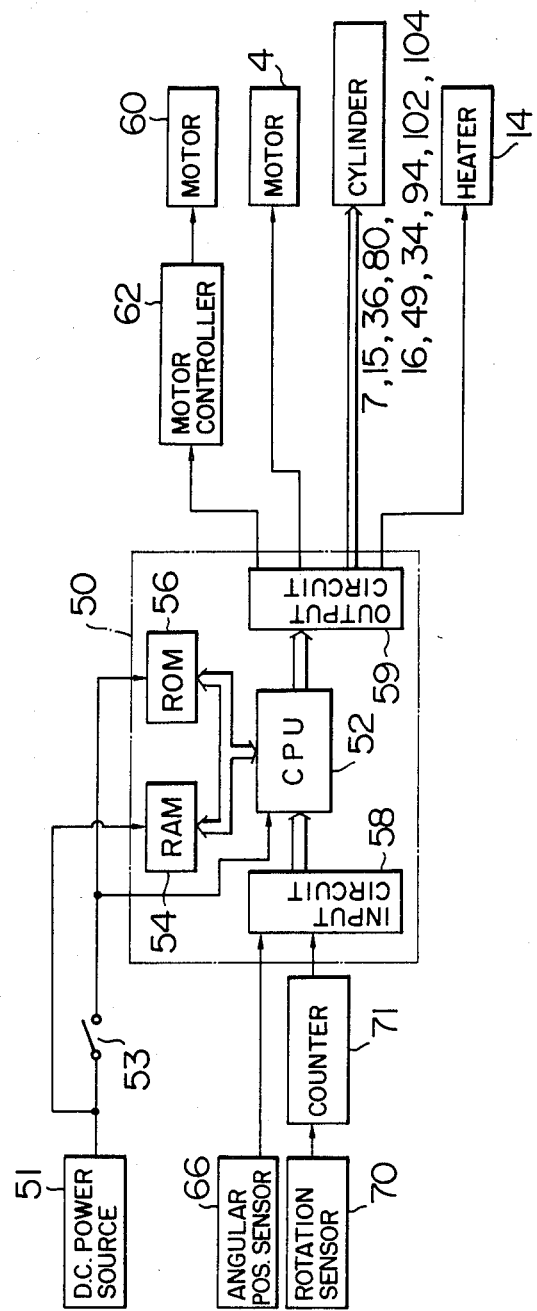
FIG. 3 is a block diagram showing a control section for controlling the apparatus shown in FIGS. 1 and 2.

FIGS. 1 to 11 show a typical embodiment of the apparatus for producing an armature winding of a flat type electric motor according to the present invention. FIG. 3 is a block diagram showing a control circuit for controlling the armature winding producing apparatus shown in FIGS. 1 and 2.

Referring to the drawings, the operation of various parts of the armature winding producing apparatus will be described.

A control circuit 50 shown in FIG. 3 is attached to a frame 24 shown in FIG. 1 and includes a CPU 52, a RAM 54, ROM 56, an input circuit 58, and an output circuit 59. The control circuit 50 may be a programable controller MODEL PLB-48R produced by Izumi Electric Co., Ltd. The input circuit 58 receives a pulse signal produced by a position sensor 66 shown in FIG. 1 and a signal produced by a programable counter 71 connected to a revolution sensor 70 also shown in FIG. 1. The output circuit 59 applies a control signal to a motor controller 62 which controls an induction motor 60 shown in FIG. 1 and applies a pulse signal of a predetermined frequency to a synchronous motor 4 also shown in FIG. 1. The output circuit 59 further applies a control signal to each of air pressure cylinders 7, 15, 16, 34, 36, 49, 80, 94, 102, and 104 so as to control the drive for the piston and piston rod of each of the air pressure cylinders. The CPU 52 causes the output circuit 59 to produce signals on the basis of the signal applied to the input circuit 58 and the data stored in the RAM 54, in accordance with a predetermined program stored in the ROM 56. The CPU 52 and the ROM 56 are connected to a DC power supply 51 through a main switch 53, while the RAM 54 is directly connected to the same DC power supply 51.

Figure 11:
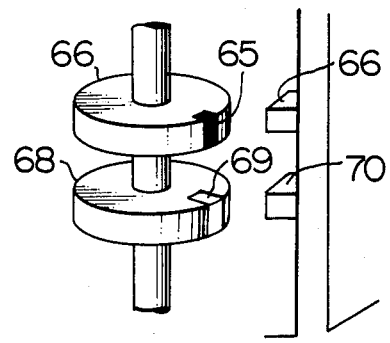
FIG. 11 is a diagram showing a position detection section and a revolution number detection section.

In FIGS. 1 and 2, when the motor 60 is driven by a control signal from the motor controller 62, a rotary shaft 72 rotates so that a pulley 74 mounted on a rotary shaft 13 is rotated through a rotation belt 37. Thus, when the rotary shaft 13 is rotated, a rotary disk 17 mounted on the rotary shaft 13 is also rotated. A flyer 18 is mounted on the rotary shaft 13. A pair of rotary disks 64 and 68 are mounted on the rotary shaft 13 and the angular position sensor 66 and the rotation sensor 70 are mounted on a plate 86 in such a manner that the sensors 66 and 70 are in opposition to the disks 64 and 68, respectively, as shown in FIG. 1. As shown in FIG. 11, the angular position sensor 66 may be, for example, a magnetic sensor such as a reed switch, and a permanent magnet 65 is provided at a predetermined position on the periphery of the rotary disk 64 opposed to the magnet 65. Thus, when the magnet 65 comes to the position opposed to the reed switch 66, that is when the flyer 18 comes to a predetermined position, the reed switch 66 is closed so as to produce an output pulse. The revolution sensor 70 may be, for example, a photo sensor for radiating a light beam and receiving a reflected beam. A slot 69 is formed on the non-metal rotary disk 68 made of aluminum, for example, opposed to the photo sensor at a position on the periphery of the disk 68 substantially corresponding to the position of the permanent magnet 65. In the slot, a metal member for reflecting the light beam is inserted. Thus, when the slot 69 comes to a position adjacent to the sensor 70, the revolution sensor 70 produces an output pulse. Thus, the revolution sensor 70 produces one output pulse to counter 71 per one revolution of the rotary shaft 13, that is, per one revolution of the flyer 18, so that the contents of the counter 71 indicates the number of revolutions of the flyer 18. The contents of the counter 71 are applied to the input circuit 58.

Figure 5:
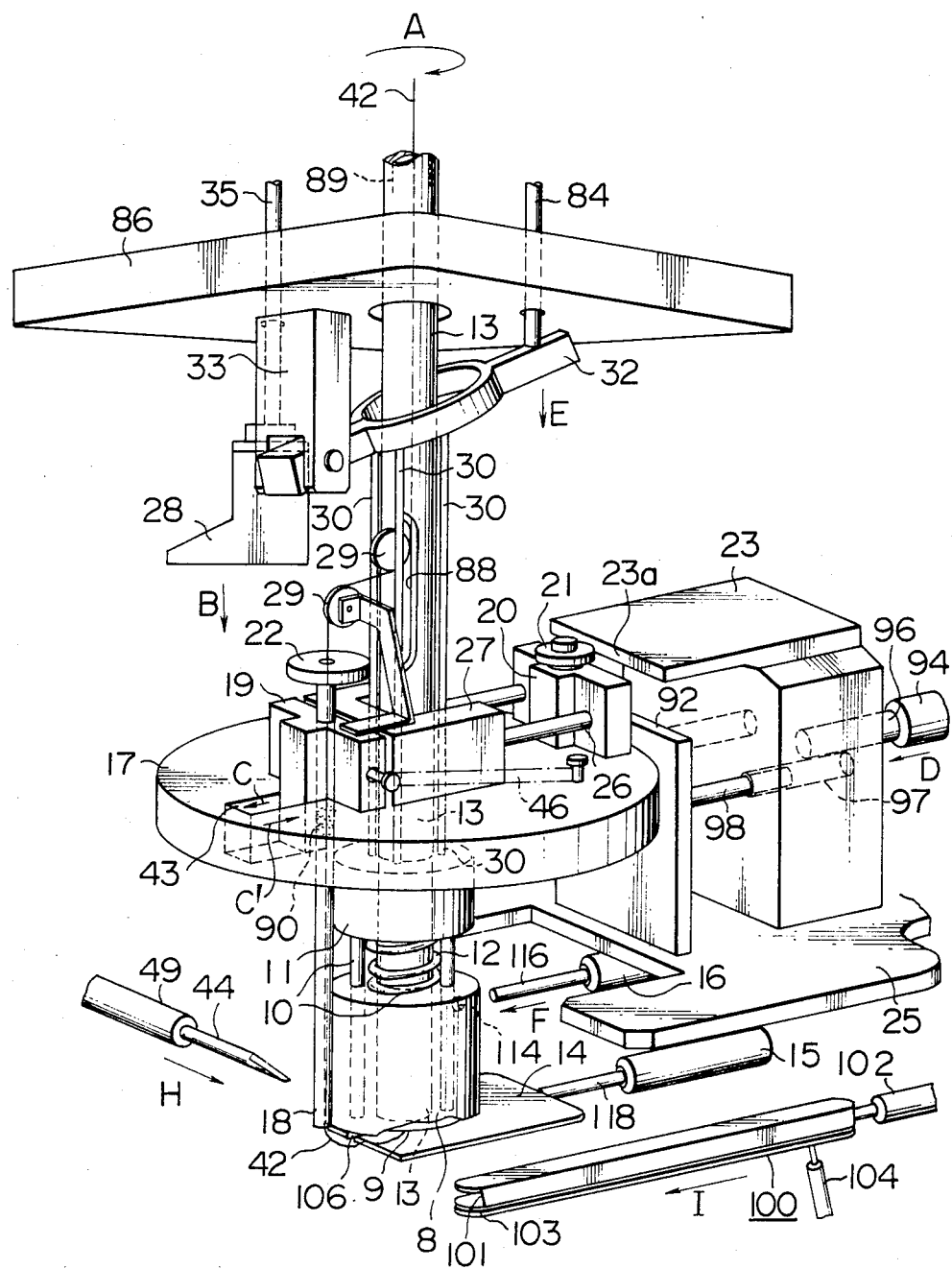
FIG. 5 is an enlarged diagram of a main part of the apparatus shown in FIGS. 1 and 2.

A copper wire covered with a coating onto which a thermosetting bonding agent has been further applied is used as a strand (wire) 42 to form the armature winding. An opening 88 is formed in the rotary shaft 13 at a longitudinally middle portion thereof (FIG. 5). The opening 88 communicates with an upper opening of the rotary shaft 13 through a through hole 89 formed in the rotary shaft 13. As shown in FIG. 5, a groove 43 is formed in the rotary disk 17 and a T-shaped flyer support member 19 is slidably received in the groove 43. A pair of pulleys 29 are fixedly mounted on the member 19 which supports the flyer 18 in such a manner that the flyer 18 can slide through the member 19. The flyer 18 has a substantially disk-like member 22 at the top thereof with a through hole through which the strand 42 is passed. The strand 42 supplied from a strand supply section (not shown) is led out of a nozzle of the flyer 18 through the through hole 89 and the opening 88 of the rotary shaft 13, a through hole formed in the pulley 29 and the through hole of the flyer 18, as shown in FIG. 5.

A member 27 is fixedly attached to the rotary disk 17 and slidably receives therein a connection rod 26. The connection rod 26 is connected at its one end to the member 19 and at its other end to a member 20 slidably provided on the rotary disk 17. A reception member 21 is fixedly attached onto the upper surface of the member 20. A spring 46 is connected to the respective side surfaces of the member 19 and the rotary disk 17 to thereby urge the member 19 in the direction C' as shown in FIG. 5.

A pushing member 23 is slidably provided on the upper surface of a support plate 25 provided on the under side of the rotary disk 17. The pushing member 23 is fixedly connected at its rear side to a piston rod 96 of the air pressure cylinder 94 fixedly attached to the support plate 25. The member 23 has a pair of holes 97 formed therein from its front surface toward its rear surface so as to slidably receive therein a pair of connection rods 98. Each of the connection rods 98 is connected at its one end to a fixed member 92 fixedly attached onto the upper surface of the support plate 25. Thus, when the piston rod 96 is displaced in the direction of arrow D by the cylinder 94, the pushing member 23 is displaced along the connection rod 98. The rotary shaft 13 is arranged to stop at a position at which the reed switch 66 is closed and at which time the rotary disk 17 is at the position as shown in FIG. 5, that is at the position where the tip end 23a of the push member 23 is in opposition to the reception member 21. Thus, when the pushing member 23 is displaced in the direction of arrow D, the pushing member 23 urges the reception member 21 so that the member 20 is displaced in the direction of arrow C so as to shift the support member 19 in the groove 43 against the tension force of the spring 46.

A piston rod 35 of the air pressure cylinder 36 is fixedly attached onto the pushing member 28 as shown in FIG. 2. The pushing member 28 is disposed above the disk-like member 22 and the groove 43 and the bottom of the member 28 has a length substantially equal to that of the groove 43 in the direction of arrow C. Thus, when the piston rod 35 is caused to come down by the cylinder 36, the pushing member 28 is displaced down, that is, in the direction of arrow B so as to push the upper surface of the member 22 to thereby cause the flyer 18 to come down in the direction of arrow B. If the piston rod 35 is displaced up, the pushing member 28 also moves up. Since the flyer 18 is connected to the support member 19 through a spring 90, the flyer 18 and the member 22 are caused to come up to their initial positions by the tension of the spring 90.

A piston rod 84 of the air pressure cylinder 34 as shown in FIG. 2 is linked with one end of a swing arm 32 such that it encircles the rotary shaft 13. The other end of the arm 32 is linked with one end of a support rod 33, the other end of which is fixed to the support plate 86. Four pins 30 are linked at their one end with the swing arm 32 such that they encircle the rotary shaft 13 and extend along the shaft 13. The other end of each of the pins 30 passes through the rotary disk 17 and is put in contact with the upper surface of a push-out pin mounting member 11. The member 11 has a through hole through which the rotary shaft 13 passes. Two push-out pins 10 are fixed at their one end onto the member 11 at its lower surface such that they encircle the rotary shaft 13 and extend along the shaft 13. The respective other ends of the two push-out pins 10 are passed through two through holes correspondingly formed in a cylindrical bobbin member 8 and exposed at the bottom surface of the bobbin member 8. The bobbin member 8 has a further through hole at the center of the two through holes so as to pass the rotary shaft 13 therethrough. A spring 12 is provided around the rotary shaft 13 and between the member 11 and the bobbin member 8, and fixedly attached at its bottom surface of the member 11 and at its other end to the upper surface of the bobbin member 8. A shaft 13 is journaled by members 8 and 11 in a manner such that shaft 13 is rotatable with respect to a support plate 25, and members 8 and 11 are stationary relative to plate 25. Thus, when the piston rod 84 is moved down in the direction of arrow E by the cylinder 34, the arm 32 rotates clockwise in FIG. 5 to cause the respective pins 30 to come down in the direction of arrow E. Thus, the member 11 comes down against the repulsion of the spring 12 to cause the push-put pins 10 to project from the bottom surface of the bobbin member 8.

Figure 7:
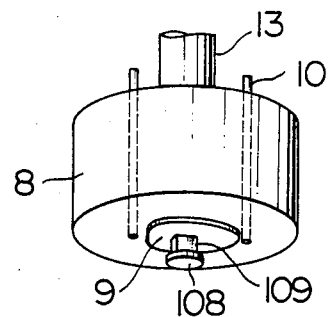
FIG. 7 is a schematic diagram showing a bobbin member.

As shown in FIG. 7, a substantially egg-like bobbin core portion 9 having a thickness of about 0.8 mm is fixedly attached to the bottom surface of the bobbin member 8. Thus, the strand 42 fed from the flyer 18 is wound around the bobbin core portion 9 when the flyer 18 rotates about the bobbin member 8 as the rotary shaft 13 rotates.

A heater plate 14 is attached onto the tip end of a piston rod 118 driven by the air pressure cylinder 15 such that it is disposed at a position adjacent to and under the bobbin core portion 9.

Figure 8A:
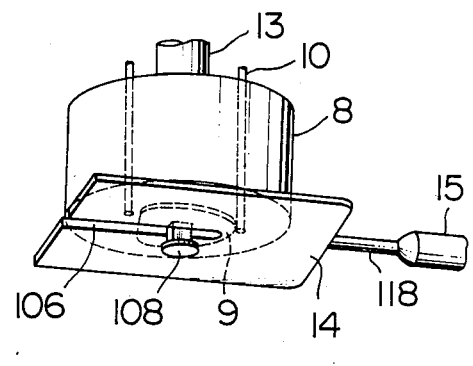
FIGS. 8A and 8B are schematic diagrams showing the bobbin member and a heater plate.
Figure 8B:
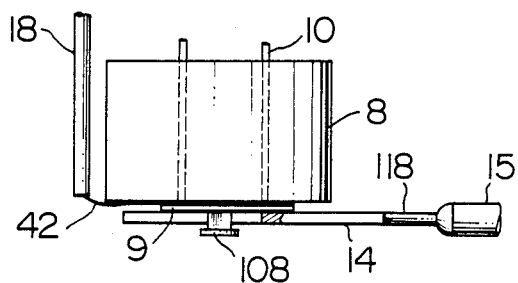

A bolt 108 is attached at a position on the bottom of the bobbin core portion 9 and slightly offset from the center of revolution of the rotary shaft 13 as shown in FIGS. 7, 8A and 8B. The bolt 108 has a rectangular leg portion 109. Thus, as the piston rod 118 is driven and the heater plate 14 is displaced to the under side of the bobbin core portion 9, the bolt 108 moves within a slit 106 and the heater plate 14 stops in such a state as shown in FIG. 8A. In this state, the bolt 108 is prevented from being rotated by the heater plate 14 and so the bobbin member 8 is prevented from rotating.

In FIG. 1, a disk 76 having a slot 78 is fixedly attached on the upper surface of the pulley 74. A piston rod 82 driven by the cylinder 80 is provided in opposition to the disk 76. When driven by the cylinder 80, the piston rod 82 moves in the direction of arrow G so that the tip end thereof engages the slot 78 to fix the pulley 74. At this time, the flyer 18 and the reception member 21 are in the positional relation as shown in FIG. 5 so that the permanent magnet 65 and the reed switch 66 are in opposition to each other and the reed switch 66 is closed. Accordingly, the piston rod 82 is used to set the rotary shaft 13 at a predetermined angular position when the winding operation of an armature winding is initiated.

As shown in FIGS. 2 and 5, a slot 114 is formed in the side surface of the bobbin member 8 and a piston rod 116 driven by the cylinder 16 is provided in opposition to the slot 114. Thus, when driven to move in the direction of arrow F (FIG. 5), the piston rod 116 engages the slot 114 to fix the bobbin member 8. At this time the bobbin member 8 is at a position where the bolt 108 is positioned by the slot 106 of the heater plate 14. Accordingly, the piston rod 116 is used to prevent the angular position of the bobbin member 8 from shifting upon the beginning and terminating of the winding of each unit coil of an armature winding.

Figure 6:
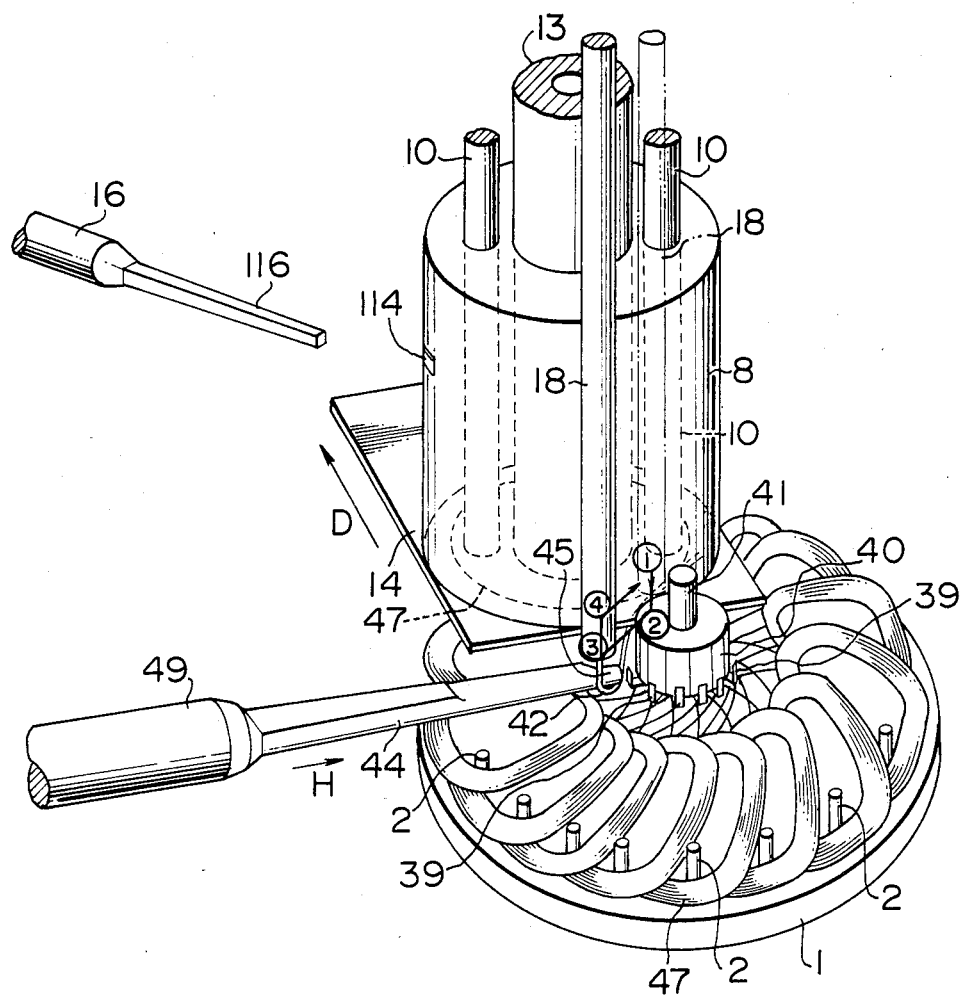
FIG. 6 is a diagram for explaining the operation of a main part of the apparatus shown in FIGS. 1 and 2.

A piston rod 44 is disposed substantially in the same plane as the heater plate 14 as shown in FIGS. 1, 5 and 6, and when driven by the cylinder 49, the piston rod 44 moves in the direction of arrow H (FIG. 5) to be positioned adjacent to a commutator 40 to catch the strand 42 fed out of the nozzle of the flyer 18 (FIG. 6).

Figure 10:
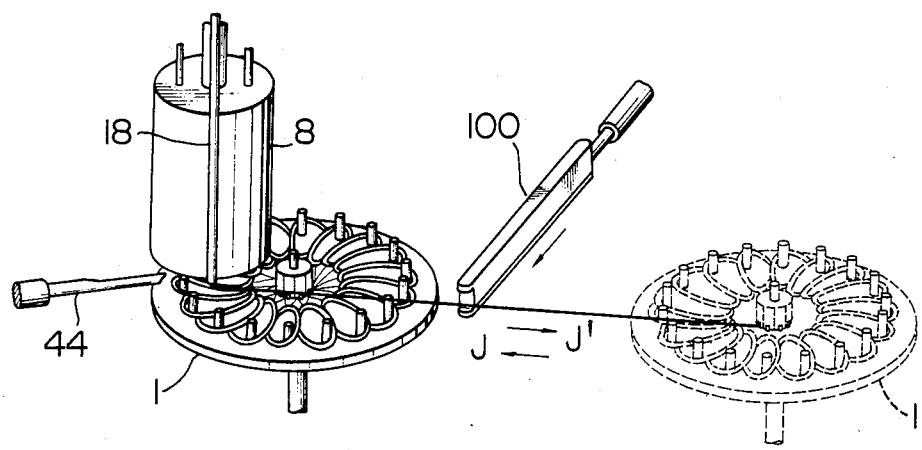
FIG. 10 is a diagram showing the operation of the turntable and a cutter.

As shown in FIGS. 5 and 10, a cutter 100 is disposed adjacent to a turntable 1 and arranged such that it is adapted to be displaced by the cylinder 102 in the direction I and a cutter portion 101 and a hold portion 103 of the cutter 100 are actuated by the cylinder 104 to respectively cut and hold the strand 42.

Figure 4:
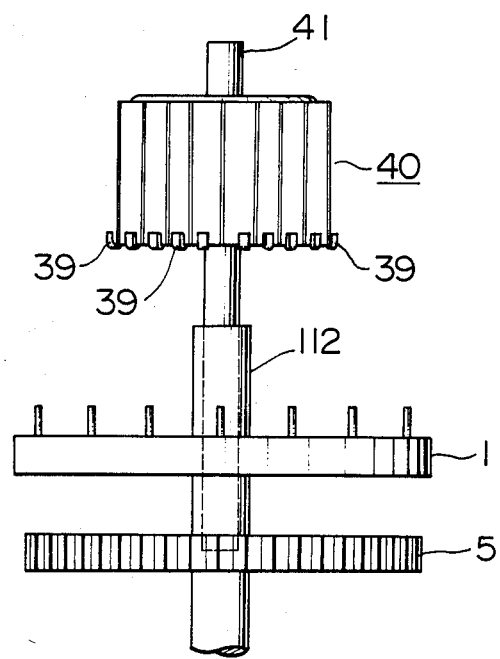
FIG. 4 is a fragmentary diagram showing the state in which a commutator has been mounted on a turntable.

As shown in FIGS. 4 and 6, the cylindrical commutator 40 has a plurality of, for example twenty, commutator segments at its periphery and each of the commutator segments has a hook portion 39 at its lower portion. A rotary shaft 41 extends axially passing through the commutator 40 at its center portion so that the commutator 40 is rotated as the rotary shaft 41 rotates. The rotary shaft 41 is fixedly inserted into a rotary shaft 112 of the turntable 1 so that the commutator 40 is rotated as the rotary shaft 112 rotates.

The turntable 1 is coaxially fixed to the rotary shaft 112 and provided with a plurality of, for example twenty, equidistantly disposed pins 2 in the peripheral portions on the upper surface thereof. The rotary shaft 112 is coaxially provided with a gear 5 which engages a gear 6 coaxially provided on the rotary shaft of the motor 4.

As shown in FIG. 1, the motor 4 is fixed on the tip end of a piston rod 110 which is driven in the direction of arrow J by the cylinder 7 so that it is displaced in the direction of arrow J as the piston rod 110 is displaced. At the same time, a table 113 fixed to a casing of the motor 4 and the rotary shaft 112 pivoted to the table 113 are integrally displaced as the piston rod 110 is displaced.

Next, the operation of the apparatus for producing an armature winding of a flat type motor according to the present invention will be described by using a flowchart shown in FIGS. 12A and 12B.

Figure 12B:
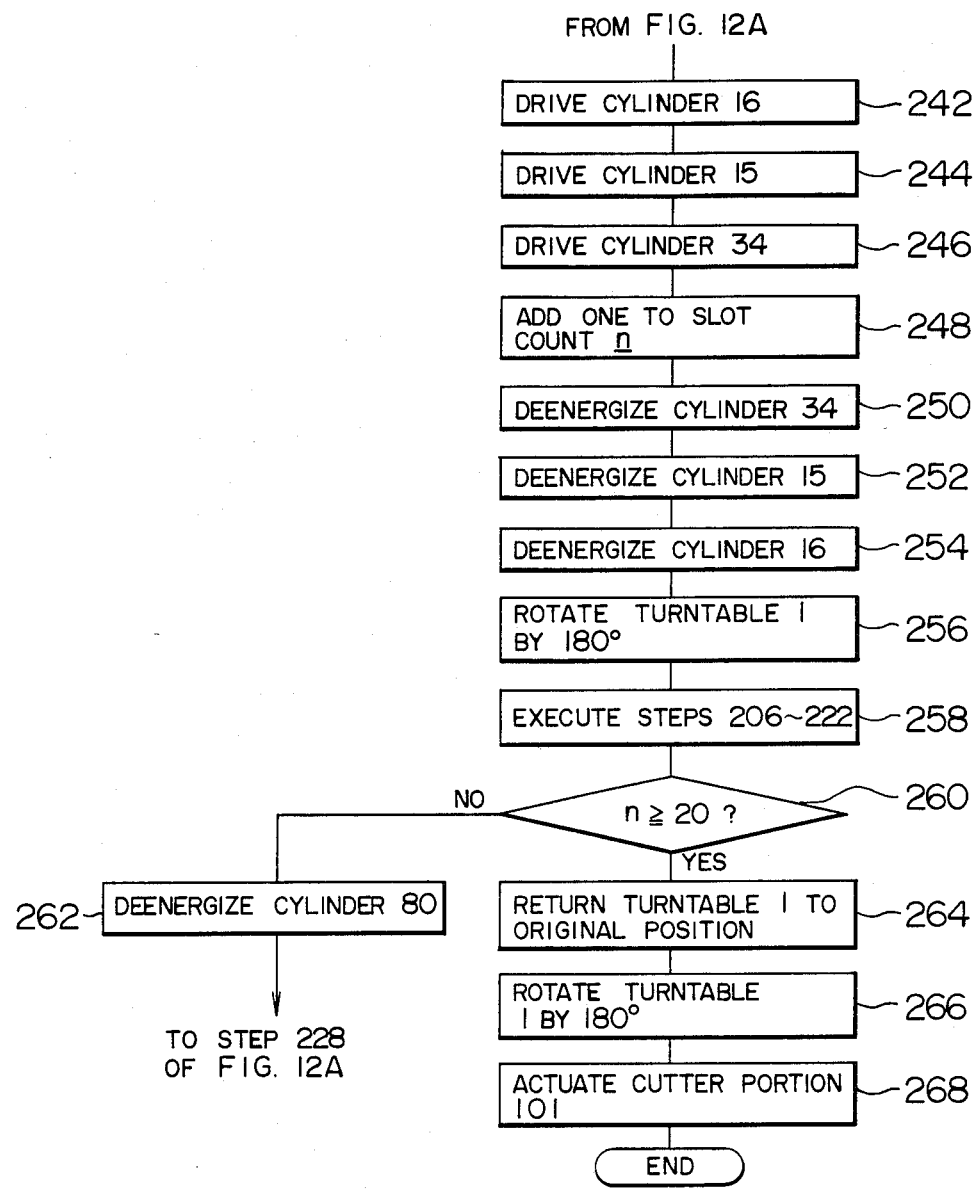

Upon turning the main switch 53 on, the control circuit 50 of FIG. 3 is energized and the CPU 52 operates in accordance with the flowchart of FIGS. 12A and 12B on the basis of a predetermined program stored in the ROM 58.

Assume now that an armature winding, merely by way of example, having twenty coil units each having thirty turns is produced according to the present invention. Accordingly, as the initial setting, the programable counter 71 is arranged such that it is automatically reset when its counts reaches thirty. The soft counter in the RAM 54 is set to twenty which is the number of the unit coils.

Then, the forward end of the strand 42 coming out of the nozzle of the flyer 18 is manually caused to be sandwiched by the hold portion 103 of the cutter 100. At this time, the corresponding cylinder 104 is in its deenergized state and therefor the hold portion 103 is manually caused to sandwich the strand 42. Next, the commutator 40 is inserted into and held by the rotary shaft 112 of the turntable 1 as shown in FIG. 4. At this time, the motor 4 and the turntable 1 are in the position as indicated by a broken line in FIGS. 1 and 10. Further, at this time, the piston rod 118 of the cylinder 15 is in its extended state and the bolt 108 is in its engaged state with the slit 106 of the heater plate 14.

Then, the pulley 74 is manually moved such that the reed switch 66 is put in opposition to the magnet 65, as shown in FIG. 1, so that the reed switch 66 is closed. Thus, the flyer 18, the rotary disk 17, the pushing member 23, etc., are put in the state as shown in FIG. 5.

When the main switch 53 is closed next, the winding operation is automatically started by the control circuit 50. Upon turning the main switch 53 on, a check is made as to whether the initial condition has been satisfied or not in the step 202. That is, a check is made as to whether the reed switch 66 is closed and all the air pressure cylinders are in their deenergized state or not, and if the initial condition has been satisfied, the operation is advanced to the step 204. In the case where the initial condition has not been satisfied, the step 202 is repeated until the initial condition is satisfied.

In the step 204, a control signal is produced from the output circuit 60 and applied to the cylinder 7 so as to displace the piston rod 110 in the direction J (FIGS. 1 and 10) to set the turntable 1 to a position adjacent to the bobbin member 8.

In the next steps 208-218, the operation to hook the strand 42 onto the hook 39 of the commutator is performed. That is, first, the cylinder 36 is driven to cause the piston rod 35 to come down so as to lower the flyer 18 from the position ① to the position ② as shown in FIG. 6 (step 206).

Then, in the step 208, the cylinder 94 (FIG. 5) is driven to displace the pushing member 23 to move the flyer support member 19 in the direction of arrow C to thereby move the flyer 18 in parallel from the position ② to the position ③ in FIG. 5.

Next, in the step 210, the cylinder 49 is driven to move the piston rod 44 in the direction of arrow H to hook the strand extending out of the nozzle of the flyer 18 onto the tip end of the piston rod 44 as shown in FIG. 6.

Figure 9:
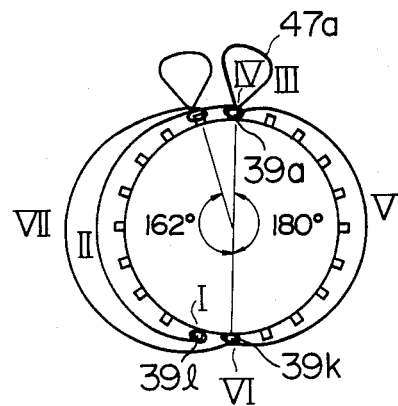
FIG. 9 is a diagram showing the winding operation by the apparatus according to the present invention.

Thereafter, the cylinder 36 is deenergized to displace the flyer 18 up from the position ③ to the position ④ in FIG. 6 (step 212), the cylinder 94 is deenergized to parallelly move the flyer 18 from the position ④ to the position ① (step 214), and the cylinder 36 is driven again to move the flyer 18 down from the position ① to the position ② (step 216). Thus, the strand 42 caught by the tip end of the piston rod 44 is hooked by the corresponding hook 39 *l* (FIG. 9).

Then, in the step 218, the cylinder 49 is deenergized to bring the piston rod 44 back to its initial position. Thus, upon completion of the hooking operation to hook the strand 42 onto the hook 39*l* as shown in the step I of FIG. 9, in the step 220 the motor 4 is driven by the control signal from the output circuit 59 to rotate the turntable 1 by 162°=(180°−360°/n), where n is the number of coil units (n=20 in this case). Accordingly, the strand 42 is caused to go around the commutator by 162° as shown in the step II in FIG. 9. Assuming now that the number of the unit coils for constituting an armature winding is twenty, the unit coils are arranged with the angular interval of 18°. Thus, the detour by 162° means the detour corresponding to nine unit coils.

Then, the cylinder 104 is deenergized so as to release the strand 42 from its held state by the hold portion 103 (step 224).

In the steps 228 to 236, then, the unit coil 47 is wound with thirty turns. In the step 226, first, the output circuit 59 transfers an energizing signal to the heater 14 to start its heating operation. In the step 228, the output circuit 59 transmits a control signal to the motor controller 62 to drive the motor 60. When the motor 60 is driven, the rotary shaft 13 is rotated to cause the flyer 18 to rotate around the bobbin member 8 so that the strand 42 is wound around the bobbin core portion 9 between the heater plate 14 and the bottom surface of the bobbin member 8. At this time, the bobbin member 8 and the bobbin core portion 9 are fixed to be stationary by the heater plate 14. An output pulse of the sensor 70 is applied to the counter 71 every revolution of the rotary shaft 13 and counted thereat. The contents m of the counter 71 is read out by the CPU 52 through the input circuit 58 and checked as to whether $m \geq 28$ or not (step 230). When m=28 is reached, the CPU 52 applies an instruction of deceleration to the motor controller 62 to decelerate the motor 60 to an inertia-free low speed (step 232). Then, check is made as to whether $m \geq 30$ or not (step 234), and if $m \geq 30$ is reached, the energization of the motor 60 is stopped to stop the motor 60 (step 236). The counter 71 is automatically stopped when m=30 has been reached. Thereafter, the air pressure cylinder 80 is driven to displace the piston rod 82 in the direction G (FIG. 1) to make the tip end of the piston rod 82 engage the slot 78 (step 238). Thus, the angular positions of the flyer 18 and the rotary disk 17 are necessarily set to the proper positions as shown in FIG. 5. In this state, the strand 42 has been wound in a flat fashion tirty times on the bobbin core portion 9 and is being heated by the heater plate 14, so that the bonding agent applied on the surface of the strand 42 is melted to bond the adjacent portions of the strand 42 to form one flat unit coil. Thus, one unit coil 47*a* has been formed as shown in the step III in FIG. 9.

Next, the operation is advanced to the step 242 in FIG. 12B, in which the air pressure cylinder 16 (FIGS. 6 and 2) is driven to make the piston rod 116 engage the slot 114 of the bobbin core portion 9 to thereby fix the bobbin member 8 by the piston rod 116 in place of the heater plate 116. In the succeeding step in which the unit coil 47 is removed from the bobbin core portion 9, the bobbin member 8 is prevented from rotating. In the succeeding step 244, the air pressure cylinder 15 is driven to displace the heater plate 14 in the direction of arrow D (FIGS. 2 and 6) to disengage the bolt 108 from the slit 106 of the heater plate 14 (FIGS. 8A and 8B). In the step 236, the air pressure cylinder 34 is driven to displace the pins 30 down, and hence to displace the pins 10 down, so as to urge the unit coil 47 down by the forward ends of the pins 10 to put the unit coil 47 onto the turntable 1.

Thus, one flat unit coil 47*a* having thirty turns is caught by the hook 39*a* as shown in the step IV in FIG. 9.

The operation is advanced to the step 248 in which the contents n of the soft counter in the RAM 54 counting the number of the formed unit coils is incremented by one. In this time, the value of n becomes one because it has been zero.

Next, in the step 250, the air pressure cylinder 34 is deenergized to displace the pins 10 up.

In the step 258, the air pressure cylinder 15 is energized to displace the heater plate 14 beneath the bobbin member 8 so as to make the bolt 108 engage the slit 106 of the heater plate 14 to thereby fix the bobbin member 8 by the heater plate 14. Next, the air pressure cylinder 16 is deenergized to retract the piston rod 116 to disengage from the slot 114 (Step 254).

Accordingly, the bobbin member 8 is fixed by the heater plate 14 again in place of the piston rod 116. In this state, the motor 60 is driven to make the turntable 1 rotate by 180° to thereby make the strand 42 go around the commutator by 180° as shown in the step V in FIG. 9 (step 256).

In the step 258, next, the steps 206 to 222 are executed to hook the strand 42 onto the hook 39k as shown in the step VI in FIG. 9, the turntable 1 is rotated by 162° (step VII in FIG. 9), and the air pressure cylinder 36 is deenergized to displace the flyer 18 up to the position ① from the position ② in FIG. 6.

Thus, the winding operation for forming one unit coil has been completed by executing the steps III to VII. In the steps V and VII, shorting wires are connected.

Then, operation is advanced to the step 260 in which check is made as to whether the unit coil count number n has reached twenty or not. Now n=1 and the operation is advanced to the step 262 in which the air pressure cylinder 80 is deenergized to pull out the piston rod 82 from the slot 78 to enable the pulley 74 to rotate.

Next, the operation is advanced to the step 228 in which the winding operation for the next unit coil is initiated.

In this manner, the steps 228 to 262 are repeated until n=20 has been reached.

If the judgement in the step 260 proves that n=20, the operation is advanced to the step 264 in which the air pressure cylinder 7 is deenergized to make the turntable 1 come back to its initial position and at the same time the motor 4 is driven to rotate the turntable 1 by 180° in the step 266. Thus, the turntable 1 is displaced in the direction of arrow J' as shown in FIG. 10 while being rotated.

When, in the step 268, the air pressure cylinder 102 is driven to displace the cutter 100 in the direction of the arrow in FIG. 10 the forward end of the cutter 100 is caused to approach the strand 42. The air pressure cylinder 104 is driven so that the hold portion 103 holds the strand 42 and the cutter portion 101 cuts the thus held strand 42.

In the manner as described above, an armature winding having twenty unit coils each having thirty turns can be produced automatically and very efficiently. The number of turns of each unit coil and the number of unit coils are described above merely by way of example, and they can be set to desired values in a practical case. Further, the counter 71 may be replaced by a soft counter in the RAM 54.

FIG. 13 is a timechart showing the operations of the respective air pressure cylinders and the motor in execution of the automatic winding operation according to the present invention. In drawing, the steps I to VII correspond the steps I to VII shown in FIG. 9.

Figure 14:
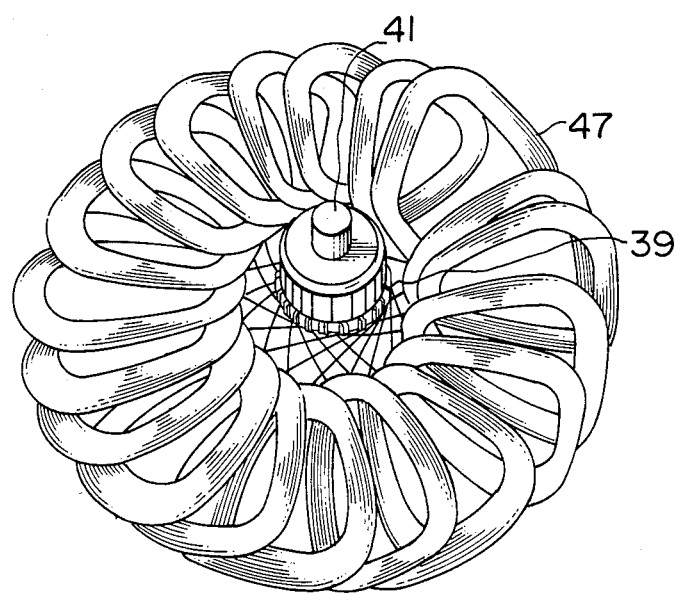
FIG. 14 is a schematic view showing an armature winding produced by the armature winding producing apparatus according to the present invention.

FIG. 14 is a perspective view of the thus produced armature.

I claim:

1. An apparatus for producing an armature winding of flat type motor comprising:
    a first motor;
    a flyer rotated by said first motor for feeding a wire for the armature winding out of a nozzle thereof;
    a bobbin member for winding the wire fed out from said flyer around the outer periphery of said bobbin member when said flyer is rotated around it to thereby form an unit coil;
    first moving means for moving said nozzle of said flyer to opposite first and second directions in parallel with a plane defined by the circle inscribed by the rotation of said nozzle;
    second moving means for moving said nozzle to opposite third and fourth directions perpendicular to said plane;
    a heater plate for heating the unit coil wound around said bobbin member;
    a turn table means for supporting a commutator on the center thereof and plural unit coils around said commutator;
    a second motor for rotating said turn table;
    pushing means for pushing the unit coil wound around said bobbin member to place on said turn table;
    guide means for catching a portion of the wire connected between said nozzle and the unit coil placed on said turn table and guiding the caught portion of the wire near a corresponding one of a plurality of hooks of said commutator mounted on said turn table;
    revolution number detecting means for detecting the revolution number of said flyer; and
    a control circuit for controlling said first and second motor, first and second moving means, heater plate, pushing means and guide means in response to an output of said revolution number detecting means;
    said control circuit said first motor so as to rotate said flyer for a predetermined number of turns around said bobbin member so as to form a unit coil having the predetermined number of turns, said control circuit also provides an energizing signal to actuate said heater plate to engage said bobbin so as to heat said unit coil, actuates said pushing means so as to place said unit coil on said turn table, and actuates said first and second moving means and said guide means thereby hooking the wire of said unit coil to the corresponding hook.

2. An apparatus for producing an armature winding of a flat type motor according to claim 1, wherein the wire is formed with a bonding agent coated on the surface of a conductor rod, and the bonding agent is melted when heated by said heater plate to bond the adjacent portions of the wires wound around said bobbin to form one flat rigid unit coil.

3. An apparatus for producing an armature winding of a flat type motor according to claim 1, wherein, after the hooking operation, said control circuit actuates said second motor so as to rotate said turn table by 180 degrees, to actuate said first and second moving means and said guide means thereby hooking the wire to corresponding one of said hooks, to actuate said second motor so as to rotate said turn table by (180−360/n) degrees (where n is the number of unit coils of said armature winding), and to actuate said first and second moving means and said guide means thereby hooking the wire to corresponding one of said hooks, said control circuit repeats above described operations for n times thereby producing said armature winding.

4. An apparatus for producing an armature winding of a flat type motor according to claim 3, further comprises:
    a cutter for cutting the wire extending between said nozzle and the unit coil, and
    turn table moving means for moving said turn table away from said bobbin member and said flyer,
    said control circuit, after placing n-unit coils on said turn table, actuating said turn table moving means and said cutter to thereby cut the wire extending between said nozzle and the unit coil placed on said turn table.

5. A method for producing an armature winding of a flat type motor in an apparatus having,
a first motor,
a flyer rotated by said first motor for feeding a wire for the armature winding out of a nozzle thereof,
a bobbin member for winding the wire fed out from said flyer around the outer periphery of said bobbin when said flyer is rotated around it to thereby form a unit coil,
first moving means for moving said nozzle of said flyer to opposite first and second directions in parallel with a plane defined by the circle inscribed by the rotation of said nozzle,
second moving means for moving said nozzle to opposite third and fourth directions perpendicular to said plane,
a heater plate for heating the unit coil wound around said bobbin member,
a turn table means for supporting a commutator on the center thereof and plural unit coils around said commutator,
a second motor for rotating said turn table,
pushing means for pushing the unit coil wound around said bobbin to place on said turn table,
guide means for cathcing a portion of the wire connected between said nozzle and the unit coil placed on said turn table and guiding the caught portion of the wire near a corresponding one of a plurality of hooks of said commutator mounted on said turn table, and
revolution number detecting means detecting the revolution number of said flyer,
said method of producing the armature winding comprising the steps of:
rotating said flyer around said bobbin member for a predetermined number of turns thereby forming a unit coil;
actuating said pushing means so as to place said unit coil on said turn table;
actuating said first and second moving means so as to move said nozzle to said first and third directions;
actuating said guide means so as to catch and guide said portion of the wire near a corresponding hook; and
actuating said first and second moving means so as to move said nozzle to said second and fourth directions.

* * * * *